United States Patent Office 2,763,655
Patented Sept. 18, 1956

2,763,655
METHYL RESERPATE O-CATHYLATE

Jacob Szmuszkovicz, Portage Township, Kalamazoo County, Mich., assignor to The Upjohn Company, Kalamazoo, Mich., a corporation of Michigan No Drawing. Application March 31, 1955,
Serial No. 498,419

1 Claim. (Cl. 260—287)

The present invention is concerned with physiologically active chemical compounds related to reserpine and is more particularly concerned with methyl reserpate O-cathylate represented by the following formula, the cathylate radical being underlined:

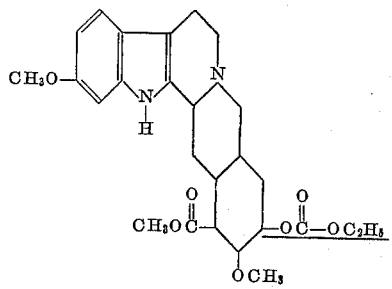

It is an object of the present invention to provide methyl reserpate O-cathylate which is a physiologically active agent of high potency having hypotensive and sedative properties and which has a superior ratio of hypotensive to sedative activity and a superior therapeutic ratio when compared with reserpine. The compound of the present invention can be substituted for reserpine in known reserpine-containing pharmaceutical compositions such as tablets, injectables, and elixirs. Other objects and uses of the present invention will be apparent to one skilled in the art.

The methyl reserpate O-cathylate of the present invention is obtained by esterification of methyl reserpate to introduce the cathylate radical, as more fully illustrated by the example below. The starting methyl reserpate is prepared by methanolysis of reserpine with sodium methoxide according to the procedure of Dorfmann et al. recorded in Helv. Chim. Acta, 37, 59 (1954). Within the meaning of the term "methyl reserpate O-cathylate" and the scope of this invention is included the free base, acid addition salts such as the sulfates, hydrochloride, phosphates, hydrobromide, acetate, propionate, benzoate, maleates, succinates, phenylacetate, $\beta$-cyclopentylpropionate, etc., and quaternary ammonium salts obtained by reaction of the free base with organic halides such as methyl iodide, ethyl bromide, benzyl chloride, etc.

The following example is illustrative only and is not to be construed as limiting the scope of the present invention.

Example

One gram of methyl reserpate was dissolved in fifty milliliters of dry pyridine and then cooled in an ice-bath. Ten milliliters of ethyl chloroformate then was added dropwise with stirring. The resulting mixture was protected from atmospheric moisture by a drying tube and maintained at room temperature for five hours. The mixture was then cooled in an ice-bath, one-hundred milliliters of water was added, and the aqueous mixture extracted four times with chloroform. The combined chloroform extracts were washed with water and with saturated aqueous sodium chloride solution and then dried over anhydrous sodium sulfate. After the removal of the drying agent, the solvent was evaporated in vacuo and methyl reserpate O-cathylate was obtained as a yellow powder. The yellow powder was dissolved in boiling benzene, treated with decolorizing charcoal twice, cooled slightly, and petroleum ether (B. P. 30–60° C.) added. The product which crystallized was removed by filtration, washed with ether, and then dried in vacuo; weight 0.80 gram; melting point 219–224 degrees centigrade. An additional recrystallization from the same solvents gave short colorless needles, melting point 219–221 degrees centigrade.

*Analysis.*—Calculated for $C_{26}H_{34}N_2O_7$: C, 64.18; H, 7.04; N, 5.76. Found: C, 64.38; H, 7.01; N, 5.67.

I claim:

Methyl reserpate O-cathylate.

No references cited.